Figures 1, 2:
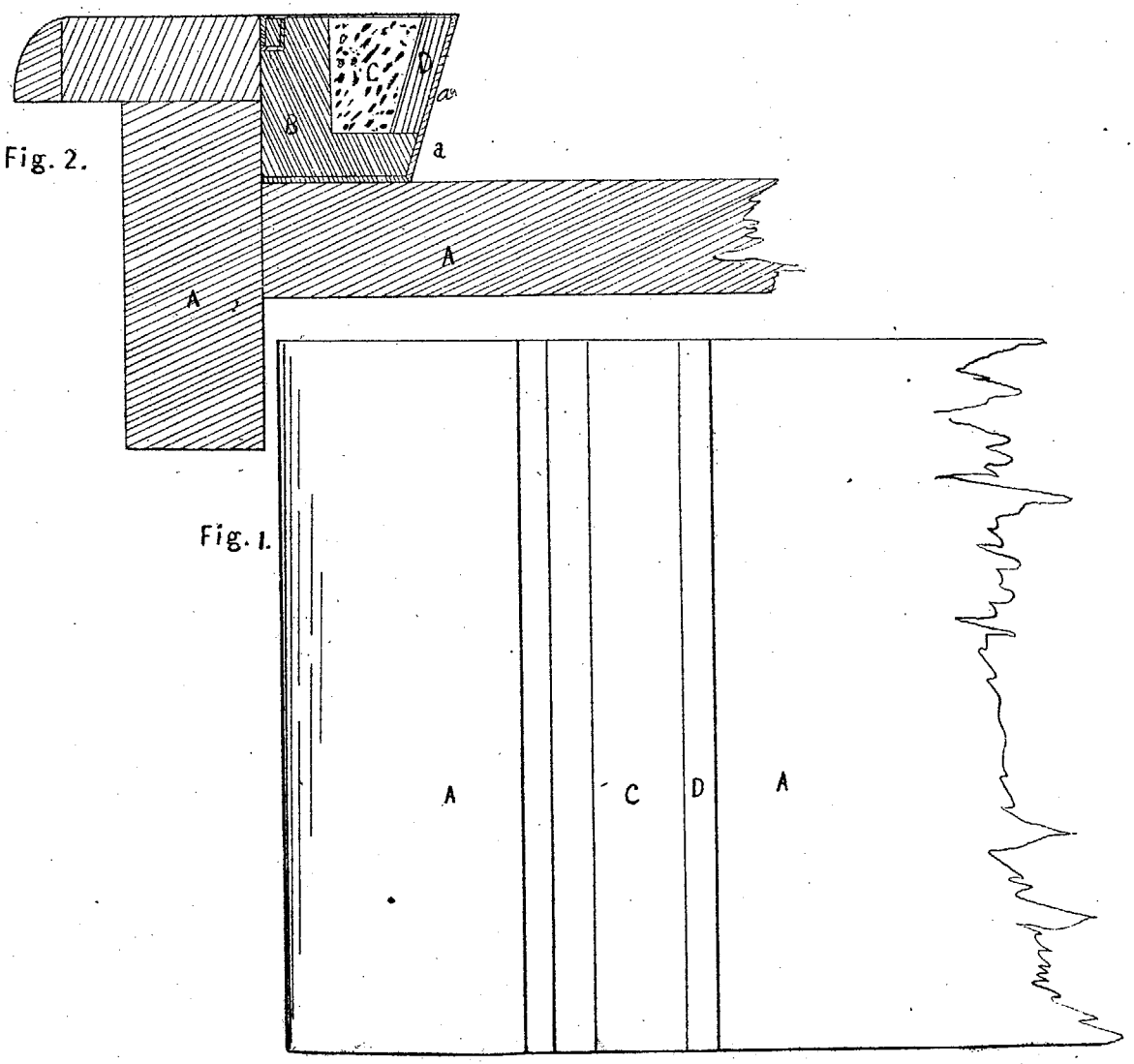

H. W. Collender.
Billiard Cushions.

No. 2,510.

Reissued Mar. 19. 1867.

Witnesses:

Andrew DeLey

W. H. Kirkof

Inventor:

Hugh W. Collender

United States Patent Office.

HUGH W. COLLENDER, OF NEW YORK, N. Y.

*Letters Patent No.* 18,805, *dated December* 8, 1857; *reissue No.* 799, *dated August* 23, 1859; *reissue No.* 2,510, *dated March* 19, 1867.

IMPROVEMENT IN BILLIARD-TABLE CUSHIONS.

The Schedule referred to in these Letters Patent and making part of the same.

TO ALL WHOM IT MAY CONCERN:

Be it known that I, HUGH W. COLLENDER, of the city, county, and State of New York, have invented a new and useful Improvement in Billiard-Table Cushions; and I do hereby declare that the following is a full, clear, and exact description thereof, reference being had to the accompanying drawings, making part of this specification, in which—

Figure 1 is a plan or top view of a portion of a billiard table with my said improved combination cushion applied, but without the cloth covering, the better to represent the construction; and Figure 2 is a vertical section of the same with the cloth covering put on.

The same letters indicate like parts in both figures.

My invention relates to an improvement on that class of billiard-table cushions known as combination cushions, the principle of which is described in Letters Patent granted to Michael Phelan, bearing date the 19th day of February, 1856; and my said invention consists of cushions for billiard tables composed of vulcanized India rubber or allied gum, having a layer rendered less compressible than the back or body by fibrous substances, or equivalent therefor, the compressible elastic back and the less compressible portion having been united while in the green or plastic state, and together vulcanized.

In the accompanying drawings, A represents the bed of the table, which may be of any known or suitable construction; B, the cushion shelf or bed; and C the elastic body or back of the cushion, made of what is known as the soft compound of vulcanized India rubber or allied gum, with a thin facing, D, of the same compound rendered less compressible by fibrous or equivalent substances; and the cloth covering *a* is then stretched over the India rubber, and attached in the usual or any other suitable manner. What I prefer for the comparatively incompressible portion is that preparation of the soft compound of vulcanizable India rubber or allied gum known to those acquainted with that branch of the arts as India-rubber belting or packing, and which is composed by thoroughly incorporating with the preparation of gum the clippings or shearings of fibrous substances. The vulcanizable compound thus prepared is rolled into a sheet of uniform thickness, and while in the green or plastic state it is applied to the outer face of the soft compound which is to form the elastic body or back, and while that is also in the plastic state, and thus united, subjected to the usual vulcanizing process by heat. It is well known that the soft compound of vulcanized India rubber, by reason of its great, uniform, and permanent elasticity, is superior to all other known substances for billiard-table cushions; but when applied to this purpose it was very soon observed that the ball was not repelled at an angle from the line of the cushion the reverse of the angle at which it was moving at the moment of impingement, and that this defect or deviation from the true angle of reflection increased as the angle of incidence of the ball was rendered more acute; and it soon became evident that this defective action resulted from the compressible elasticity of the India rubber, which permitted the ball to embed itself in the cushion, and hence to be repelled at an imperfect angle. To avoid this defect, and at the same time to retain the reacting property possessed in so high a degree by vulcanized India rubber, it was proposed to face the India-rubber back or body with steel, whalebone, cork, and other substances less compressible than vulcanized India rubber, and such cushions were made, but all of them were found to be more or less defective. Steel was injurious to the balls and to the cloth covering, and gave a disagreeable sound or "bang," and after a short time became indented or bent. Whalebone and cork could not be obtained of uniform texture, and at every junction of two pieces presented an imperfect place, and could not for any length of time endure the frequent and violent blows to which cushions are unavoidably exposed; and these and all other substances which were tried prior to my said invention produced imperfect cushions.

By the use of India rubber, rendered less compressible and less flexible by the incorporation of fibrous or equivalent substances, and by the union thereof with the India-rubber back or body while both are in the green or plastic state, and vulcanizing them together, they become as perfectly united as if made of one single piece of vulcanized India rubber, and I have been able thereby to produce cushions far superior to any known prior to my said invention.

I claim as my invention, and desire to secure by Letters Patent—

Billiard-table cushions composed of vulcanized India rubber or allied gum, with a layer rendered less compressible than the body or back by the incorporation of fibrous or equivalent substances, the said layer and back or body having been united in the green or plastic state, and together vulcanized, as and for the purpose specified.

HUGH W. COLLENDER.

Witnesses:

WM. H. BISHOP,

A. DE LACY.